(No Model.)  2 Sheets—Sheet 1.
J. A. VERNET.
SHEARS.
No. 543,275.   Patented July 23, 1895.

Witnesses
G. W. Rea.
Robt Everett

Inventor
Joseph A. Vernet.
By
James L. Norris.
Atty.

(No Model.)  J. A. VERNET.  2 Sheets—Sheet 2.
SHEARS.

No. 543,275.  Patented July 23, 1895

Witnesses
G. W. Rea.
Robert Everatt

Inventor
Joseph A. Vernet,
By James L. Norris.
Atty

United States Patent Office.

JOSEPH ARTHUR VERNET, OF DIJON, FRANCE.

SHEARS.

SPECIFICATION forming part of Letters Patent No. 543,275, dated July 23, 1895.

Application filed February 9, 1895. Serial No. 537,817. (No model.) Patented in France July 23, 1894, No. 240,356, and in Belgium December 28, 1894, No. 113,376.

*To all whom it may concern:*

Be it known that I, JOSEPH ARTHUR VERNET, a citizen of the French Republic, residing at Dijon, (Côte-d'Or,) France, have invented a new and useful Improved Machine for Shearing Channel and other Like Irons, (for which I have obtained Letters Patent of France, dated July 23, 1894, No. 240,356, and of Belgium, No. 113,376, dated December 28, 1894,) of which the following is a specification.

This invention relates to a new shearing-machine to be worked by manual power or by a motor, and designed to cut channel irons, rails, angle-irons, and other irons of special section, wherein is employed a stationary and a movable cutter, each of which embraces the iron to be cut upon all sides, the movable cutter moving axially about the iron and severing the same with a shearing cut.

I have shown, by way of example, in the accompanying drawings the arrangement I have adopted, while reserving to myself the right to modify the same as practice may suggest.

Figure 1:
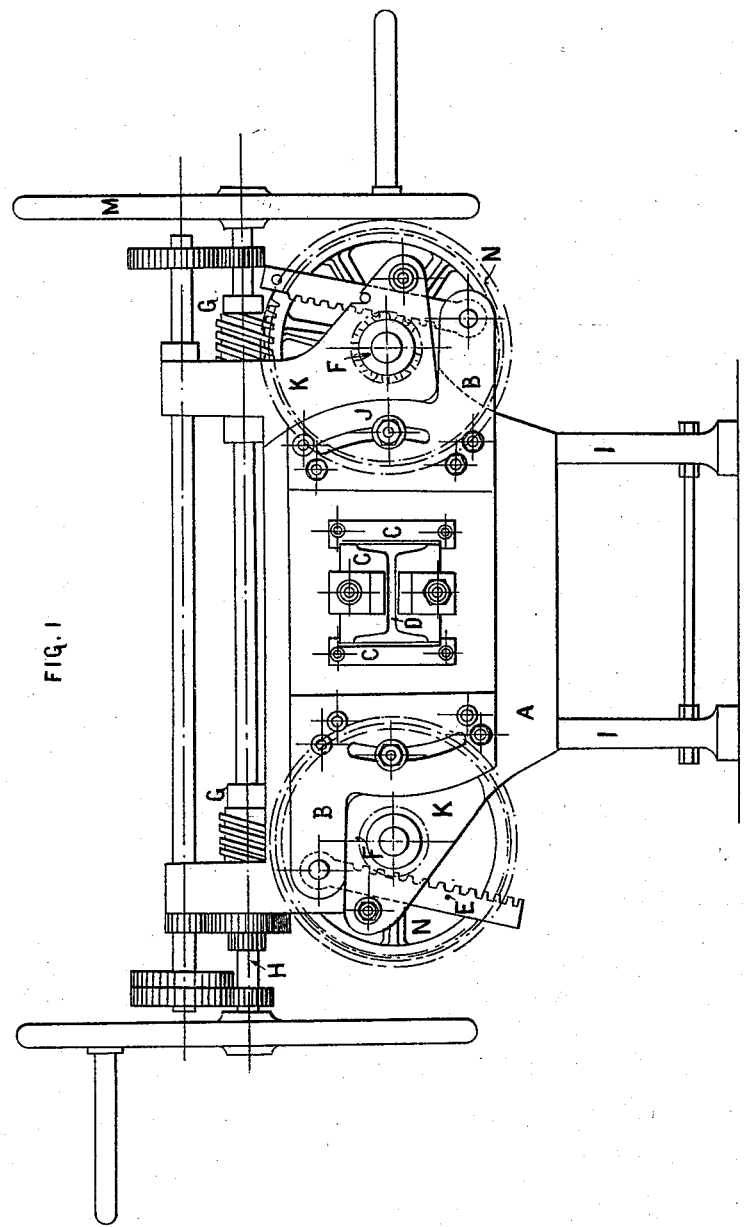
Figure 2:
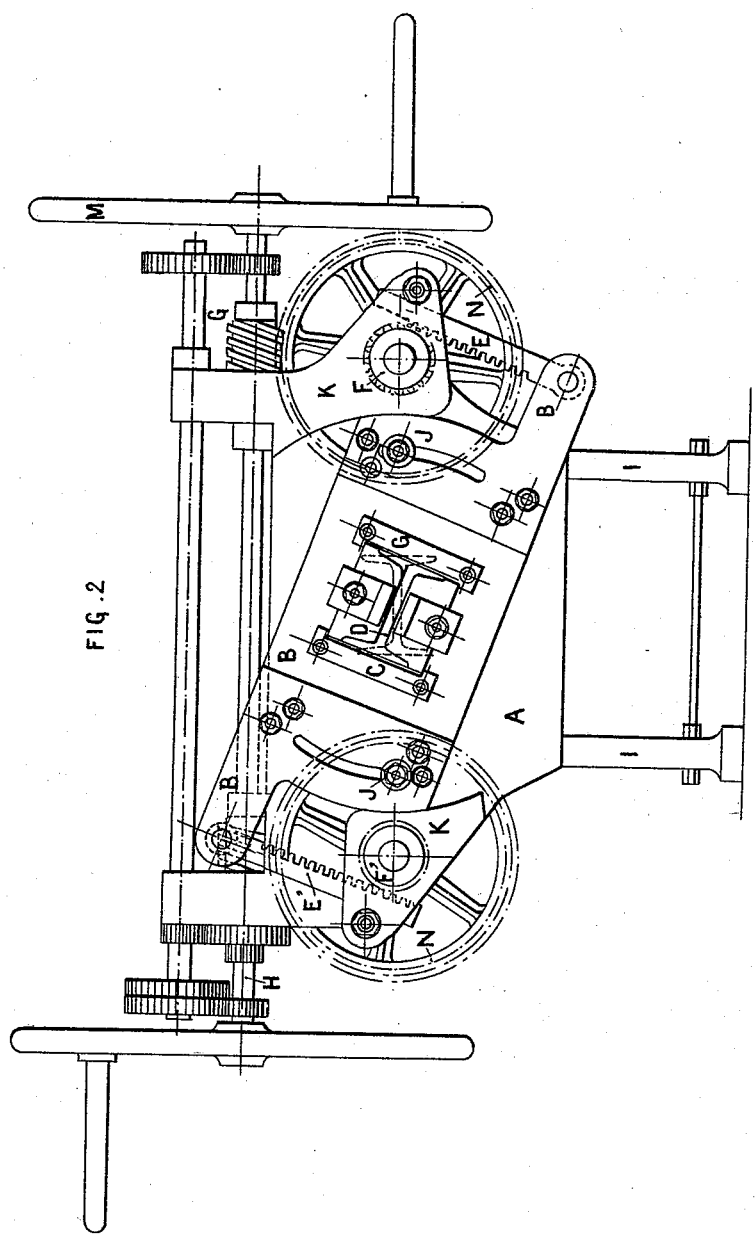

Figure 1 is an elevation of the shearing-machine ready for cutting. Fig. 2 shows the same at the moment that an iron has been cut.

The machine comprises two side pieces or cheeks A B of wrought or cast iron held one against the other by screw-bolts J fixed in the side piece A, which rests on two legs. Each side piece or cheek carries blades or tools C shaped to correspond to the kind of irons to be cut.

I pass the bar to be cut into the space D for its reception between the tools and cause the movable side piece B to turn, or pivot by mechanism acting on racks E E', this side piece taking for its axis the bar to be cut, which is held between the tools or blades centrally of the machine. The movable side piece in turning moves axially about the iron bar and severs the same with a shearing cut. As there remains in the bar a small central part, which is not wholly cut, at a certain moment the rack E, in which, as well as from the pinion F, some teeth are missing, stops, while the other rack E' continues its course, and by displacing the central point of the axis finally cuts the bar.

If necessary, and according to the nature of the work to be done, one end of the movable side piece or cheek may be kept stationary or partly so, or one of the ends of this cheek may be caused to turn more quickly than the other.

The racks for actuating the movable side piece are driven by pinions rotated by worm-gearing, but any other convenient arrangement of mechanism for actuating the movable side piece may be employed.

What I claim, and desire to secure by Letters Patent, is—

In a machine for shearing metal bars, the combination with a stationary and a movable plate having coincident apertures of the shape of and adapted to receive the bar to be cut, of means for turning said movable plate about said bar as an axis, and means for finally moving said plate transversely to the axis of said bar, substantially as described.

In testimony whereof I have signed this specification in the presence of two subscribing witnesses.

JOSEPH ARTHUR VERNET.

Witnesses:
   CLYDE SHROPSHIRE,
   J. P. LORE.